(12) United States Patent
Pucciani (10) Patent No.: US 8,444,188 B2
(45) Date of Patent: May 21, 2013

(54) ADAPTER

(75) Inventor: Allen S. Pucciani, Beavercreek, OH (US)

(73) Assignee: Illinois Tool Works Inc., Glenview, IL (US)

( * ) Notice: Subject to any disclaimer, the term of this patent is extended or adjusted under 35 U.S.C. 154(b) by 335 days.

(21) Appl. No.: 12/613,493

(22) Filed: Nov. 5, 2009

(65) Prior Publication Data

US 2010/0117356 A1    May 13, 2010

Related U.S. Application Data

(60) Provisional application No. 61/112,772, filed on Nov. 9, 2008.

(51) Int. Cl.
*F16L 19/00*    (2006.01)

(52) U.S. Cl.
USPC ............... 285/370; 285/148.18; 285/148.23; 285/397

(58) Field of Classification Search
USPC .......... 285/369, 370, 371, 334.2, 383, 31, 285/272, 373, 334.1, 148.18, 148.22–148.26, 285/397; 141/364, 375, 319; 403/292, 296, 403/298
See application file for complete search history.

(56) References Cited

U.S. PATENT DOCUMENTS

| | | | | |
|---|---|---|---|---|
| 1,389,004 A * | 8/1921 | Johnston | | 285/58 |
| 1,801,171 A * | 4/1931 | Mueller et al. | | 285/289.5 |
| 2,011,433 A * | 8/1935 | Blagg et al. | | 285/329 |
| 2,092,358 A * | 9/1937 | Robertson | | 285/213 |
| 2,419,453 A * | 4/1947 | Kocevar | | 285/148.23 |
| 2,814,508 A * | 11/1957 | Seamark | | 285/95 |
| 2,920,178 A * | 1/1960 | Schossow | | 392/403 |
| 3,167,333 A * | 1/1965 | Hall et al. | | 285/357 |
| 3,521,913 A * | 7/1970 | Verhein et al. | | 285/109 |
| 3,602,531 A * | 8/1971 | Patry | | 285/148.23 |
| 3,760,430 A * | 9/1973 | Brenden | | 4/111.1 |
| 4,823,771 A * | 4/1989 | Menning | | 126/563 |
| 5,060,689 A * | 10/1991 | Csaszar et al. | | 137/515 |
| 5,361,855 A * | 11/1994 | Schuermann et al. | | 175/67 |
| 5,487,571 A * | 1/1996 | Robertson | | 285/259 |
| 5,507,538 A * | 4/1996 | Phillips | | 285/390 |
| 5,636,878 A * | 6/1997 | Millward et al. | | 285/55 |
| 5,983,923 A * | 11/1999 | Hobbs et al. | | 137/360 |
| 6,038,992 A * | 3/2000 | Smith | | 114/183 R |
| 6,769,721 B2 * | 8/2004 | Guest | | 285/347 |
| 6,840,702 B2 * | 1/2005 | Ko | | 403/292 |
| 2005/0134045 A1* | 6/2005 | Mohan et al. | | 285/370 |
| 2005/0156429 A1* | 7/2005 | Muckenschnabel et al. | | 285/47 |
| 2005/0248151 A1* | 11/2005 | Connell | | 285/286.2 |
| 2006/0163871 A1* | 7/2006 | Van Pelt et al. | | 285/238 |

* cited by examiner

*Primary Examiner* — Michael P Ferguson
*Assistant Examiner* — Jay R Ripley
(74) *Attorney, Agent, or Firm* — Fletcher Yoder P.C.

(57) ABSTRACT

A system includes an adapter configured to provide an interface between a first fluid conduit and a second fluid conduit. The adapter has an inner wall and an outer wall. The adapter has a first end configured to fit against a first inside wall of the first fluid conduit. The adapter also has a second end configured to fit against a second inside wall of the second fluid conduit. The inner wall of the adapter has a first curvilinear transition from a first inside diameter at a first opening of the first end to an intermediate diameter between the first and second ends. The inner wall of the adapter has a second curvilinear transition from a second inside diameter at a second opening of the second end to the intermediate diameter.

15 Claims, 6 Drawing Sheets

ADAPTER

CROSS REFERENCE TO RELATED APPLICATION

This application claims the benefit of U.S. Provisional Patent Application No. 61/112,772, entitled "Adapter," filed on Nov. 9, 2008, which is herein incorporated by reference in its entirety.

BACKGROUND

The present disclosure relates generally to adapters and, more particularly, to adapters that provide an interface between two or more fluid conduits.

A variety of systems transfer fluids from one location to another through fluid conduits, such as metal or plastic pipes. Couplings, such as adapters, fittings, bushings, and elbows, may be used to couple one fluid conduit to another. Unfortunately, existing couplings are often designed for a single industry standard. Moreover, existing couplings generally create abrupt changes in diameter, which leads to flow resistance and poor performance over long runs of conduit.

BRIEF DESCRIPTION

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

Embodiments of an adapter are provided to facilitate an interface for connecting two or more fluid conduits. The disclosed embodiments include a system with an adapter having a first end configured to couple to an inner wall of a first fluid conduit in a concentric arrangement, and a second end configured to couple to an inner wall of a second fluid conduit in a concentric arrangement. The adapter includes an inner wall that is tapered so as to provide a gradual sloping transition from an inner diameter at the first end to an inner diameter at the second end, thereby providing an aerodynamic flow path having reduced obstacles that would otherwise disrupt fluid flow. The gradual sloping transition may be linear or curvilinear. In certain embodiments, the first fluid conduit may include a pipe and the second fluid conduit may include a hose. In such embodiments, the second end may include one or more surface features to provide a secure connection to the hose. In a further embodiment, a first end of the adapter may be coupled to a hose and a second end may be coupled to a nozzle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As discussed in further detail below, various embodiments of an adapter are provided to facilitate an interface for connecting two or more fluid conduits. In certain embodiments, an adapter includes a first end configured to couple to an inner wall of a first fluid conduit in a concentric arrangement, and a second end configured to couple to an inner wall of a second fluid conduit in a concentric arrangement. In one embodiment, the first fluid conduit may include a pipe and the second fluid conduit may include a hose. In this embodiment, the second end may include one or more surface features to provide a secure connection to the hose. In another embodiment, a first end of the adapter may be coupled to a hose and a second end may be coupled to a nozzle. The adapter further includes an inner wall that is tapered so as to provide a gradual sloping transition, which may be linear or curvilinear, from an inner diameter at the first end to an inner diameter at the second end. The foregoing features, among others, of the adapter may have the effect of providing an aerodynamic flow path that has reduced obstacles (e.g., compared to certain conventional adapters) that would otherwise disrupt fluid flow.

Figure 1:
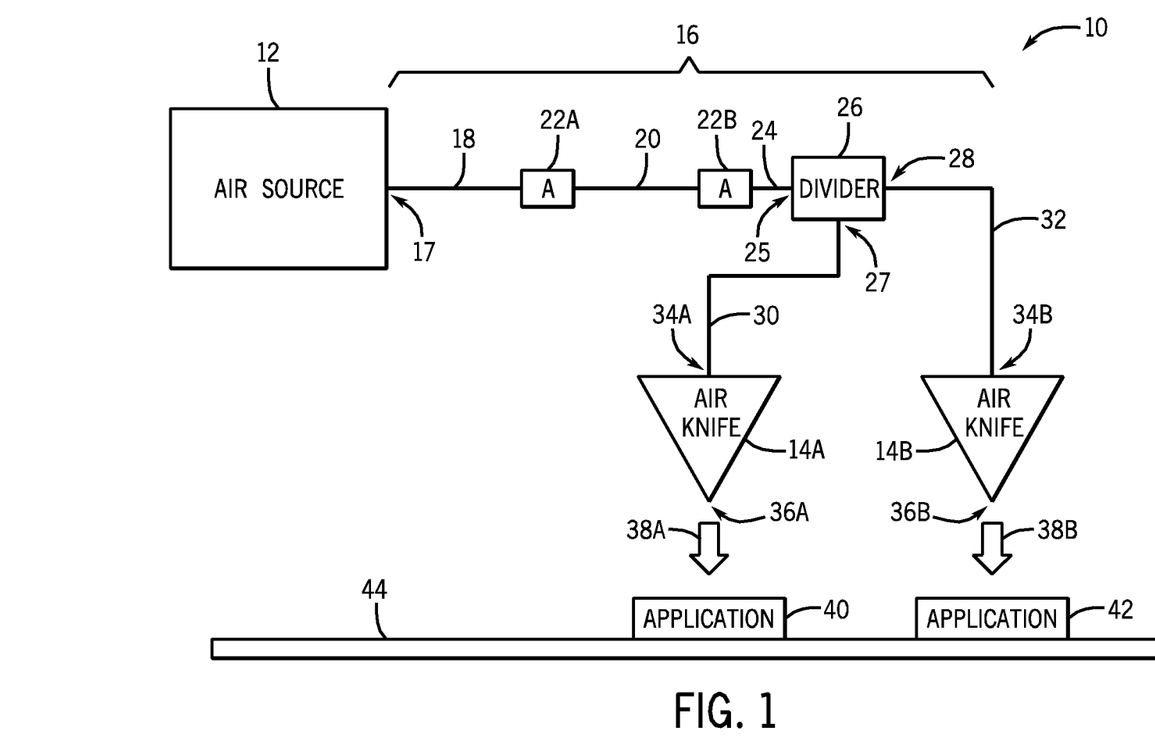
FIG. 1 is a simplified block diagram depicting a fluid-based system having fluid conduits coupled together via one or more adapters, in accordance with embodiments of the present disclosure.

Turning now to the drawings, FIG. 1 illustrates a processing system 10 that may incorporate one or more aspects of the presently disclosed techniques. The processing system 10 includes an air supply source 12 that may deliver a fluid (e.g., air) to air knives 14A and 14B along a flow path 16. In the illustrated embodiment, the flow path 16 includes the fluid conduits 18, 20, 24, 30, and 32, the adapters 22A and 22B, and the divider 26.

In the presently illustrated system 10, the air supply source 12 may include a high flow centrifugal blower ("air blower") which, in some embodiments, may include a supercharger and motor configuration. In one embodiment, the operating characteristics of the air blower 12 may provide an air flow having a pressure of between approximately 1 to 10 pounds per square inch (psi) or, more specifically, between approximately 1 to 4 psi, and having a flow rate of between approximately 50-2000 cubic feet per minute (CFM) or more specifically, between approximately 150 to 1500 CFM. In some embodiments, the air blower 12 may be housed within an enclosure. The air blower 12 may be separated from the air knives 14A and 14B by a distance of 10, 20, 30, 40, 50, 100, or 200 feet or more. As such, the flow path 16 is configured to provide a path through which air provided by the blower 12 may be routed and ultimately delivered to the air knives 14A and 14B.

The air blower 12 may include an outlet 17 coupled to the fluid conduit 18 defining a first portion of the flow path 16. The fluid conduit 18 may be coupled to the fluid conduit 20 by way of a first adapter 22A. By way of example only, the fluid conduit 18 may be a hose, such as a flexible hose, and the fluid conduit 20 may be a pipe, such as a stainless steel pipe, a polyvinyl chloride (PVC) pipe, an acrylonitrile butadiene styrene (ABS) pipe, or a copper pipe. As mentioned above, due to industry-set standards that define characteristics of such pipes, the hose 18 may not be capable of coupling directly to the pipe 20. To provide an example, a PVC pipe having a "nominal diameter" of 3 inches based upon the American National Standards Institute (ANSI) Schedule 40 standard may have an outside diameter (OD) of 3.5 inches, a wall thickness of approximately 0.22 inches, and thus an inside diameter (ID) of approximately 3.06 inches. Further, assuming that the hose 18 has an ID of 3 inches, it is difficult and impractical to couple the hose 18 having a 3 inch ID to either the ID or OD of an ANSI schedule 40 PVC having a 3 inch nominal diameter without some type of intermediate adapter between the conduits 18 and 20.

Accordingly, the adapter 22A is configured to provide an interface for coupling the hose 18 and pipe 20. The adapter 22A may include a first adapter end configured to couple to the hose 18, and a second adapter end configured to couple to the pipe 20. As will be discussed in further detail below with respect to FIGS. 2-4, the first end of the adapter 22A may include one or more surface features, such as grooves or protrusions, to facilitate a secure coupling to an inner surface of the hose 18. Additionally, the second end of the adapter 22A may be configured to be fitted against the inner wall of the pipe 20 in a concentric arrangement, and may be secured thereto by an adhesive material, such as a glue or other suitable type of bonding material. The adapter 22A may also include a smooth tapered inner wall, as will be discussed in additional detail below, that may have the effect or providing an aerodynamic flow path with fewer obstacles that may disrupt fluid flow when compared to certain conventional adapters. In this manner, the hose 18, adapter 22A, and pipe 20 are fluidly coupled, thus allowing air from the blower 12 to flow from the hose 18 into the pipe 20.

From the adapter 22A, the flow path 16 continues to the distal end of the pipe 20, which may be coupled to another hose 24 by way of a second adapter 22B. In embodiments where the hose 24 has an ID that is substantially identical to the ID of the hose 18, the adapter 22B may be substantially identical to the adapter 22A. In embodiments where the hose 24 has an ID that is greater than or less than that of the hose 18, the OD of the "hose-end" of the adapter may be configured accordingly to facilitate coupling to the hose 24, and the degree of the taper along the inner wall of the adapter 22B may also vary accordingly. An embodiment of such an adapter 22B will be discussed in more detail below with respect to FIGS. 5-7.

By way of the adapter 22B and hose 24, the air flow from the blower 12 may be received by an inlet 25 of the manifold or flow divider 26. The divider 26 may be configured to distribute or split the air flow to multiple outlets 27 and 28. Additional fluid conduits 30 and 32 may respectively couple the outlets 27 and 28 to the air knives 14A and 14B, respectively. In the illustrated embodiment, the air knives 14A and 14B each have an inlet (34A and 34B) configured for a hose connection, and the fluid conduits 30 and 32 may thus be provided as hoses, such as flexible hoses. In other embodiments, a pipe may be disposed between the divider 26 and one of the air knives 14A or 14B, whereby adapters similar to the above-discussed adapters 22A or 22B are coupled to each end of the pipe to facilitate a connection between hoses extending from an outlet (e.g., 27 or 28) of the divider 26 and from an inlet (e.g., 34A or 34B) of one of the air knives (e.g., 14A or 14B). In some embodiments, the system 10 may include only a single air knife (e.g., 14A) and thus may not include a divider 26. Instead, the fluid conduit 24 may be coupled directly to the air knife 14A.

The air knife 14A may include a plenum for receiving an air flow via its inlet 34A. In certain embodiments, the air knife 14A may be formed of materials including aluminum, stainless steel, or some combination thereof. The plenum may pressurize and discharge the received air through an outlet 36A, which may include a continuous narrow slot or a series of holes. By way of example, an outlet 36A in the form of a continuous slot may have a width of between approximately 0.025 to 0.1 inches, and may have an area that is substantially less than the area of the inlet 34A. In embodiments where the outlet 36A includes a single continuous slot, the outlet 36A may have a length that is approximately equal to the length of a main body of the air knife 14A (e.g., measured along a longitudinal axial direction). Accordingly, the air flow 38A exiting the outlet 36A of the air knife 14A may have a velocity that is substantially greater than the velocity of the air flow entering the inlet 34A. As can be appreciated, the air knife 14B may be constructed in a manner that is similar to the air knife 14A and, thus may operate in a similar manner. Further, while only two outlets 27 and 28 are shown in FIG. 1, it should be appreciated that the divider 26 may be configured to provide any suitable number of outlets, and may provide flow paths to any suitable number of devices, including additional air knives, additional dividers, manifolds, and so forth.

The air flow 38A and 38B exiting the outlets 36A and 36B of each of the air knives 14A and 14B, respectively, may be directed towards the applications 40 and 42 of the processing system 10, which may be transported through the system 10 via a conveyor belt 44. As will be appreciated, the processing application represented by the system 10 may utilize the air flow 38A and 38B from the air knives 14A and 14B, respectively, for drying products, removing debris, coating control, cooling applications, leak detection, surface impregnation, corrosion prevention, and so forth. For instance, in certain embodiments, the system 10 may be a system for drying food or beverage containers, such as cans or bottles, or may be a system for removing dust and other debris from sensitive electronic products, such as printed circuit boards (PCBs) or the like. In addition, the air flow 38A and 38B may, in some embodiments, also be utilized by the system 10 to clean and/or remove debris from the conveyer belt 44.

In the presently illustrated system 10, the fluid conduits 18, 20, 24, 30, and 32 may be formed using any suitable material. For example, where the fluid conduits are hoses (e.g., 18, 24, 30, 32), such hoses may be formed from rubber, nylon, polyurethane, polyethylene, PVC, polytetrafluoroethylene (e.g., Teflon® available from E.I. du Pont de Nemours and Company of Wilmington, Del.), or any other suitable materials or a combination of such materials. Where the fluid conduit is a pipe, such pipes may be formed from PVC, ABS, copper, stainless steel, aluminum, galvanized steel, or any other suitable materials or a combination of such materials. Additionally, depending on the type of application provided by the system 10, it should be understood that some of the above-mentioned materials may be unsuitable or unsanitary for certain applications, such as food and beverage applications. Thus, the material forming the fluid conduits and the adapters may be selected based upon the type of application that the system 10 is configured to perform.

Figure 5:
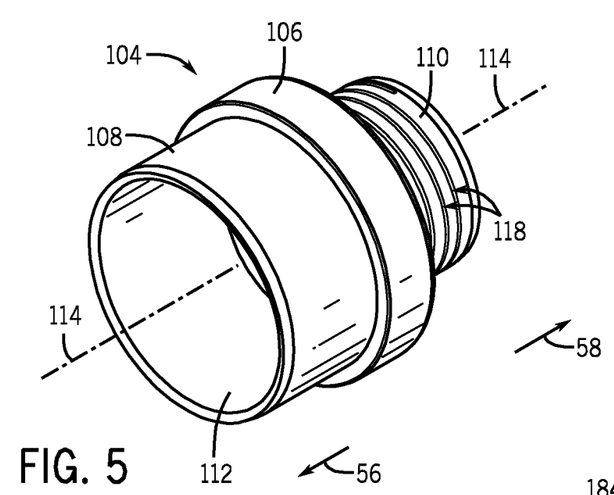
FIG. 5 is a perspective view of a second embodiment of an adapter.
Figure 6:
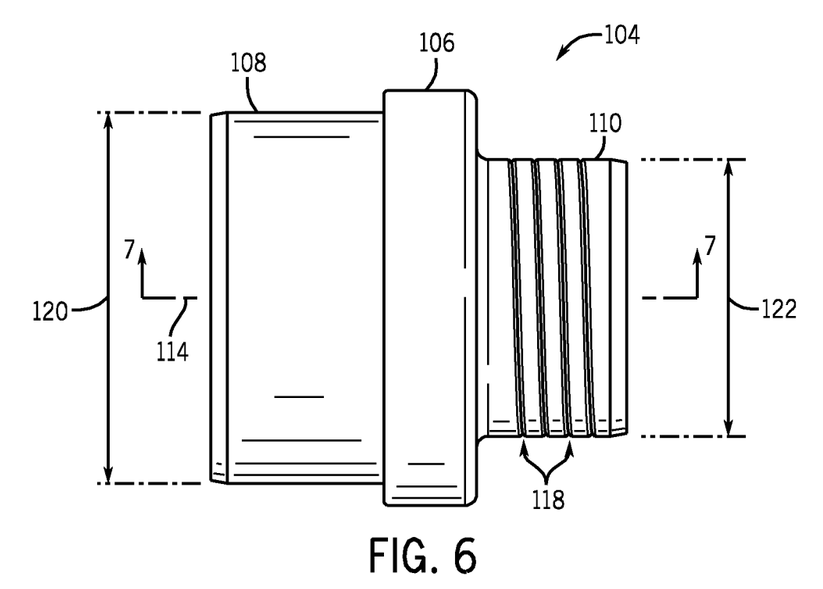
FIG. 6 is a side view of the second embodiment of the adapter shown in FIG. 5.
Figure 7:
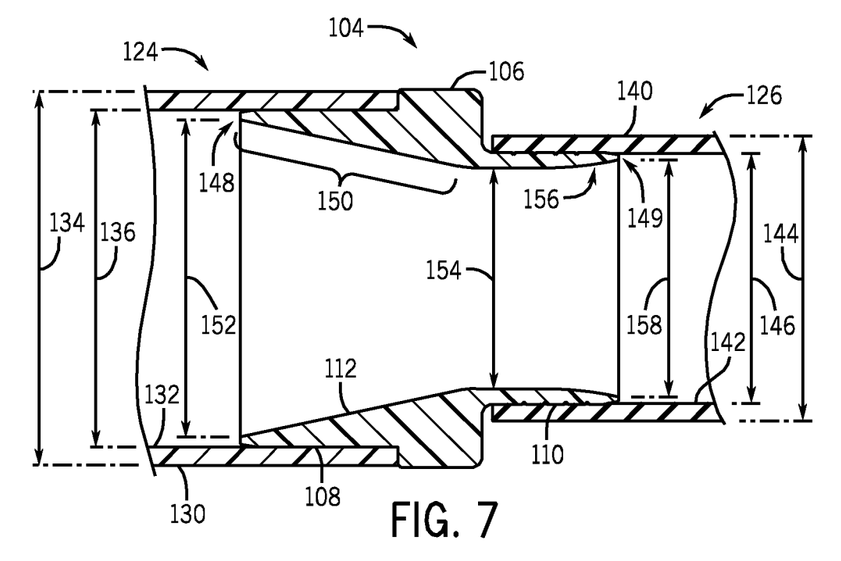
FIG. 7 is a cross-sectional side view of the second embodiment of the adapter taken along line 7-7 of FIG. 6, illustrating the adapter coupled to a first fluid conduit and a second fluid conduit.
Figure 8:
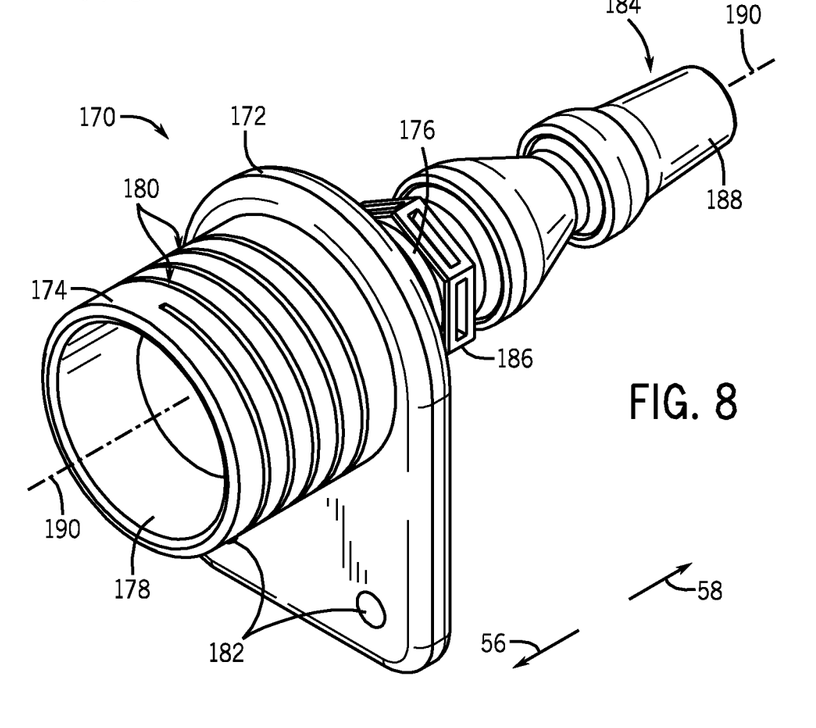
FIG. 8 is a perspective view of a third embodiment of an adapter having a nozzle at one end.
Figure 9:
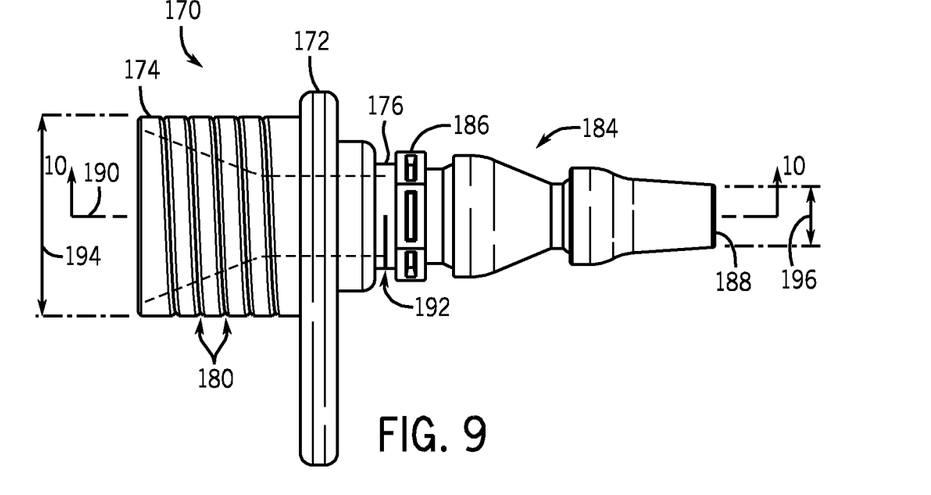
FIG. 9 is a side view of the third embodiment of the adapter shown in FIG. 8.
Figure 10:
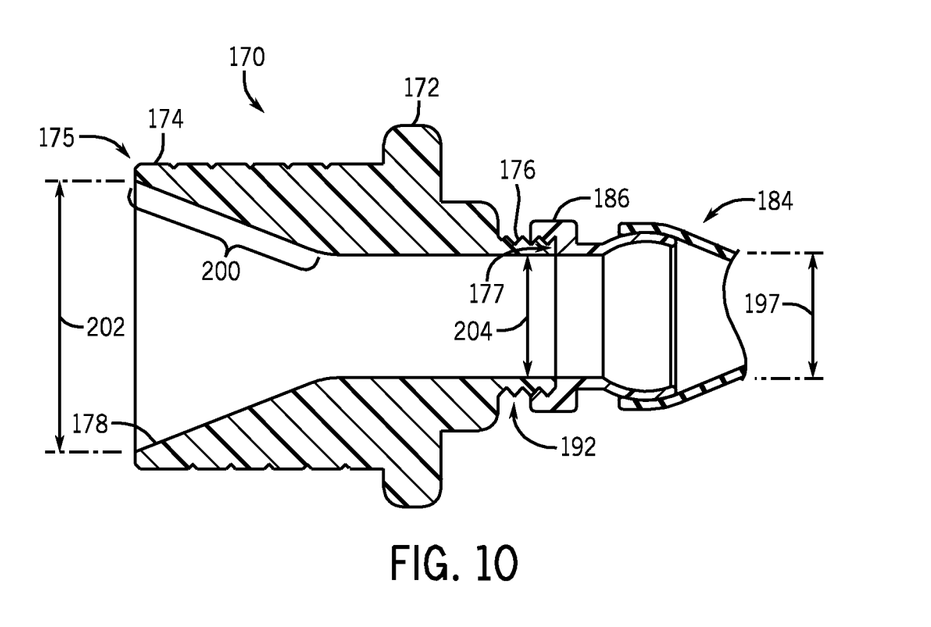
FIG. 10 is a cross-sectional side view of the third embodiment of the adapter taken along line 10-10 of FIG. 9.

Having now described the general operation of the system 10, various embodiments of the above-described adapter 22 will now be discussed in more detail. In particular, FIGS. 2-4 depict a first embodiment, FIGS. 5-7 depict a second embodiment, and FIGS. 8-10 depict a third embodiment of an adapter for connecting fluid conduits in accordance with aspects of the present disclosure.

Figure 2:
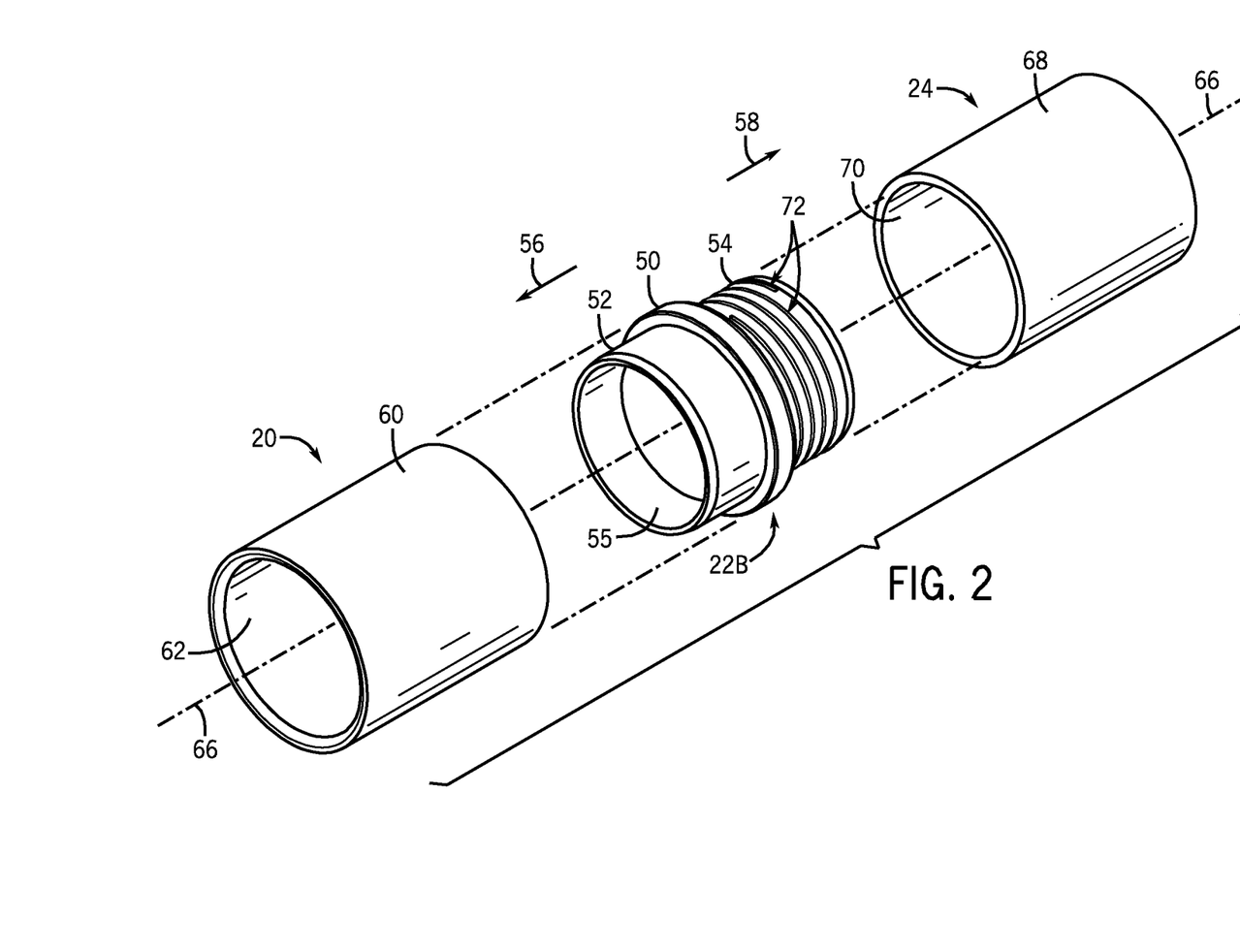
FIG. 2 is a perspective exploded view of a first embodiment of an adapter exploded from a first fluid conduit and a second fluid conduit.
Figure 3:
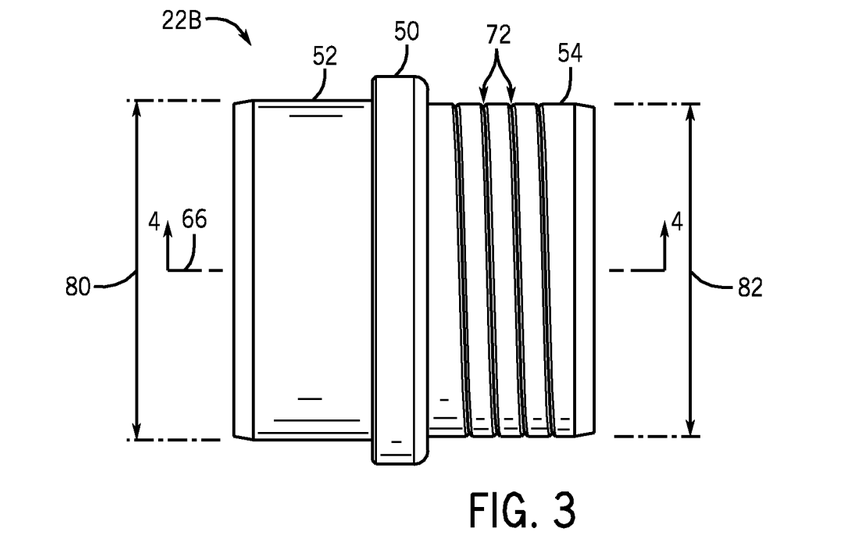
FIG. 3 is a side view of the first embodiment of the adapter shown in FIG. 2.
Figure 4:
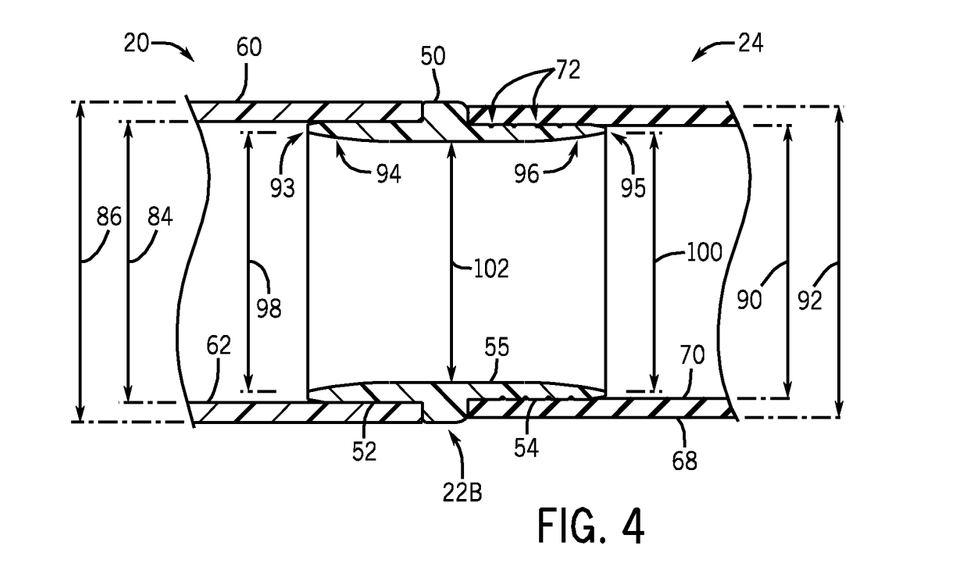
FIG. 4 is a cross-sectional side view of the first embodiment of the adapter taken along line 4-4 of FIG. 3, illustrating the adapter coupled to the first fluid conduit and the second fluid conduit, as shown in FIG. 2.

Referring now to FIGS. 2-4, a first embodiment of the adapter 22B is illustrated. Specifically, FIG. 2 depicts a portion of the flow path 16 (FIG. 1) that includes the adapter 22B, a pipe 20 (located upstream 56 from the adapter 22B with respective to the direction of air flow), and a hose 24 (located downstream 58 from the adapter 22B with respective to the direction of air flow), by way of a perspective exploded view. FIGS. 3 and 4 further depict side and cross-sectional views, respectively, of the adapter 22B.

As shown in FIG. 2, the adapter 22B is generally cylindrical in shape and includes an annular protrusion 50 between a first end 52 and a second end 54. The annular protrusion 50 may be in the form of an annular lip or a flange-like structure. The adapter 22B has an inner wall 55 which, as discussed above, may be tapered to provide a gradual transition between an ID at the first end 52 and an ID at the second end 54. The pipe 20 has an outer wall 60 and inner wall 62, and the first end 52 (e.g., a "pipe-end") of the adapter 22B may be configured to fit against the inner wall 62 of the pipe 20 in a concentric arrangement, such that the pipe 20 abuts the annular protrusion 50 when assembled onto the adapter 22B. In certain embodiments, the pipe-end 52 of the adapter 22B may have a generally smooth outer wall, which may be secured to the inner wall 62 of the pipe 20 using glue or some other suitable type of adhesive material.

Downstream (e.g., direction 58) of the adapter 22B, the hose 24 that includes an outer wall 68 and an inner wall 70 may be fitted onto the second end 54 (e.g., a "hose-end") of the adapter 22B. In the depicted embodiment, the hose-end 54 includes one or more surface features 72, which may facilitate coupling of the hose 24 to the hose-end 54. By way of example, the surface features 72 may include a series of spiral grooves cut into the outer wall of the hose-end 54, or may include a series of spiral-shaped protrusions formed on the outer wall of the hose-end 54. As will be appreciated, any suitable surface texture (also referred to as "teeth") may be provided, such as a parallel series of ring-shaped grooves or ridges, etc. The surface features 72 may be configured to grip the inner wall 70 of the hose 24, thus securing the hose 24 onto the hose-end 54 via a concentric arrangement.

Like the pipe 20, the hose 24 may be fitted onto the hose-end 54, such that the hose 24 abuts the annular protrusion 50. Thus, it should be appreciated that each end 52 and 54 of the adapter 22B provides the function of a male-type adapter when fitted into (e.g., against an inner wall) a corresponding fluid conduit. Further, embodiments of the adapter 22B may be integrally formed from a single piece of material, rather than being assembled using separate parts. For example, the adapter 22B may be molded and/or machined from a single piece of material, such as stainless steel, PVC, ABS, brass, or some other suitable material. When assembled, the pipe 20, adapter 22B, and the hose 24 form a fluid flow path that shares a common longitudinal axis, referred to here by reference number 66.

FIG. 3 shows a side view of the adapter 22B discussed in FIG. 2. FIG. 4 shows a cross-sectional view of the adapter 22B assembled with the pipe 20 and hose 24 that is taken through the longitudinal axis 66 and along cut-line 4-4 of FIG. 3. In order to provide a clear description of the disclosed subject matter, FIGS. 3 and 4 will generally be described together. As indicated in FIG. 3, the pipe-end 52 has an OD 80, and the hose-end 54 has an OD 82. The OD 80 may be sized such that the pipe-end 52 may be securely fitted against the inner wall 62 of the pipe 20 having an ID 84 and an OD 86 (FIG. 4). By way of example only, a 3 inch nominal diameter ANSI Schedule 40 PVC pipe 20 may have an OD 86 of 3.5 inches and an ID 84 of approximately 3.06 inches. Similarly, the OD 82 of the hose-end 54 may be sized such that the hose-end 54 may be securely fitted against the inner wall 70 (e.g., via the surface features 72) of the hose 24 having an ID 90 and an OD 92 (FIG. 4). By way of example only, the "size" of a hose may generally be defined by its ID, i.e., a "3 inch" hose may have an ID 90 of 3 inches.

As further shown by FIG. 4, the opening 93 of the pipe-end 52 of the adapter 22B has an ID 98, and the opening 95 of the hose-end 54 has an ID 100. The inner wall 55 of the adapter may have a tapered portion 94 at the pipe-end 52 and a tapered portion 96 at the hose-end 54, such that the ID 98 and the ID 100 gradually decrease towards the annular protrusion 50 to a reduced intermediate ID 102. In other words, the tapered portions 94 and 96 of the inner wall 55 provide for a gradual sloping transition from the ID 98 at the pipe-end 52, to the intermediate ID 102, and then to the ID 100 at the hose-end 54 of the adapter 22B. The taper could be one or more conical surfaces or curved surfaces. For example, the diameter along the inside wall 55 of the adapter 22B may change linearly or curvilinearly from the ID 98 to the ID 102, and from the ID 102 to the ID 100. Additionally, in some embodiments, a curvilinear slope may be a concave or convex, or a combination of concave or convex sloping transitions. As will be appreciated, the tapered inner wall 55 provides a generally smooth and aerodynamic flow path that reduces the presence of obstacles which may disrupt fluid flow, as may be the case with certain conventional adapter configurations.

Additionally, it should be noted that the thickness of the adapter 22B at the opening 93 may be determined as the half the difference between the OD 80 (FIG. 3) and the ID 98, and that the thickness of the adapter 22B at the opening 95 may be determined as half the difference between the OD 82 and the ID 100. In some embodiments, the thickness of the adapter at each end 93 and 95 may be very small, i.e., less than 2 millimeters, to further decrease flow resistance from the pipe 20 through the adapter 22B to the hose 24.

The embodiment illustrated in FIGS. 2-4 is generally intended to show an adapter configuration in which the ID of the fluid conduits 20 and 24 differ by a relatively small amount. For instance, referring to the above-mentioned example of a hose having an ID of 3 inches and a 3 inch nominal diameter ANSI Schedule 40 PVC pipe having an ID of approximately 3.06 inches, the difference between IDs of the pipe and hose is relatively small at approximately 0.06 inches. This results in a similar relatively small difference between the ID 98 and ID 100 at the openings 93 and 96, respectively, of the adapter 22B and, therefore, the gradual transition provided by the tapered portions 94 and 96 of the inner wall 55 with respect to both the IDs 98 and 100 may be relatively small. By way of example, the embodiment shown in FIGS. 2-4 may represent a configuration in which the difference in the IDs at the pipe-end 52 opening 93 and the hose-end 54 opening 95 of the adapter 22B is between approximately 0.01 to 0.1 inches.

Again, it should be understood that the specific dimensions provided herein with respect to FIGS. 2-4 are by way of example only. Indeed, in other embodiments, the adapter 22B may be configured to provide an interface between pipes and hoses having other dimensions. For example, in certain embodiments, the pipe-end 52 may have an OD 80 configured to fit to a pipe 20 having an ID 84 of between approximately 1 and 6 inches or more (e.g., such as 1, 1.5, 2, 2.5, 3, 3.5, 4, 4.5, 5, 5.5, or 6 inches). The hose-end 54 may have an OD 82 also configured to fit to a hose 24 having an ID of between approximately 1 and 6 inches or more (e.g., such as 1, 1.5, 2, 2.5, 3, 3.5, 4, 4.5, 5, 5.5, or 6 inches). To provide some additional examples, the adapter 22B may join a hose having an ID of 4 inches and a 4 inch nominal diameter ANSI Schedule 40 PVC pipe having an ID of approximately 4.03 inches, or may join a hose having an ID of 2 inches and a 2 inch nominal diameter ANSI Schedule 40 PVC pipe having an ID of approximately 2.07 inches. Further, it should also be understood that while the presently disclosed adapters and fluid conduits are generally cylindrical (e.g., circular openings), the adapter may also be configured to provide an interface between fluid conduits having square-shaped openings, oval-shaped openings, triangular-shaped openings, and so forth.

Continuing to FIGS. 5-7, these figures depict another embodiment of an adapter, referred to by reference number 104, which may be implemented in the system 10 of FIG. 1. Specifically, FIG. 5 shows a perspective view of the adapter 104, FIG. 6 shows a side view of the adapter 104, and FIG. 7 shows a cross-sectional view of the adapter 104 coupled to first and second fluid conduits 124 and 126 taken along the cut-line 7-7 of FIG. 6. To facilitate a clearer description of the disclosed subject matter, FIGS. 5-7 will generally be described together.

Generally, the adapter 104 of FIGS. 5-7 is similar to the adapter 22B described in FIGS. 2-4, except that the difference between the IDs at opposite ends (e.g., ID 152 and ID 158 in FIG. 7) of the adapter 104 may be greater than 0.1 inches. For instance, the difference between the IDs 152 and 158 may be between 0.1 inches to 3 inches or, more specifically, 0.5 inches to 1.5 inches. In some embodiments, the difference between the IDs 152 and 158 may be greater than 3 inches. As illustrated in FIG. 7, this configuration may result in a more pronounced taper that provides a sharper transition at one end (e.g., the pipe-end 108) of an inner wall 112 of the adapter 104.

As shown in FIG. 5, the adapter 104 is also generally cylindrical in shape and includes an annular protrusion 106 between a first end 108 and a second end 110. The features 106, 108, and 110 may generally correspond to the features 50, 52, and 54 of the embodiment discussed in FIGS. 2-4. The adapter 104 also includes an inner wall 112, which may be tapered at the first 108 and second 110 ends to provide a gradual sloping transition from a larger ID at end (108 or 110) to a smaller ID at the other end of the adapter 104. As shown in FIG. 7, the first end 108 may be configured to fit to a pipe 124 located upstream (e.g., the direction 56 of FIG. 5) with respect to the direction of air flow (e.g., downstream direction 58 of FIG. 5). Accordingly, the first end 108 in the present embodiment may be referred to as a "pipe-end." The pipe 124 has an outer wall 130 and an inner wall 132, and the pipe-end 108 may be configured to fit against the inner wall 132 of the pipe 124 in a concentric arrangement, such that the pipe 124 abuts the annular protrusion 106 when assembled onto the adapter 104. Like the embodiment described in FIGS. 2-4, the pipe-end 108 of the adapter 104 may be secured to the inner wall 132 of the pipe 124 using glue or some other suitable type of adhesive material.

Downstream (e.g., direction 58 of FIG. 5) of the adapter 104, a hose 126 that includes an outer wall 140 and an inner wall 142 may be fitted onto the second end 110 (e.g., a "hose-end") of the adapter 104. Like the embodiment shown in FIGS. 2-4, the hose-end 110 of the presently illustrated embodiment also includes one or more surface features or teeth 118, such as spiral grooves or protrusions, or a parallel series of ring-shaped grooves or ridges, etc., which may facilitate coupling of the hose 126 to the hose-end 110. For instance, the surface features 118 may be configured to grip the inner wall 142 of the hose 126, thus securing the hose 126 onto the hose-end 110. Like the pipe 124, the hose 126 may be fitted onto the hose-end 110 in a concentric arrangement, such that the hose 126 abuts the annular protrusion 106. When assembled, the pipe 124, adapter 104, and the hose 126 form a fluid flow path that shares a common longitudinal axis, referred to here by reference number 114.

FIG. 6 shows a side view of the adapter 104, and FIG. 7 shows a cross-sectional view of the adapter 104 having the pipe 124 and hose 126 coupled thereto that is taken through the longitudinal axis 114 and along cut-line 7-7 of FIG. 6. As indicated in FIG. 6, the pipe-end 108 has an OD 120, and the hose-end 110 has an OD 122. The OD 120 may be sized such that the pipe-end 108 may be securely fitted against the inner wall 132 of the pipe 124 having an OD 134 and an ID 136. Similarly, the OD 122 of the hose-end 110 may be sized such that the hose-end 110 may be securely fitted against the inner wall 142 of the hose 124 having an OD 144 and an ID 146 (FIG. 7).

As discussed above, in the present embodiment, a difference, which may be greater than 0.1 (e.g., between approximately 0.1 inches and 3 inches) between the IDs 152 and 158 (FIG. 7) at opposite ends of the adapter 104 may also result in a similar difference with respect to their corresponding ODs 120 and 122, respectively. To provide one example, in such an embodiment, the pipe-end 108 may be configured to fit to a 4 inch nominal diameter ANSI Schedule 40 PVC pipe having an OD of 4.5 inches and an ID of approximately 4.03 inches, and the hose-end may be configured to fit to a hose 126 having an ID of 3 inches, such that the difference between the IDs 152 and 158 is greater than approximately 1 inch, with the larger ID 152 being at the pipe-end 108 and the smaller ID 158 being at the hose-end. By way of example only, the difference between the IDs 152 and 158 may be expressed as a ratio, such as 10:9, 9:8, 8:7, 7:6, 6:5, 5:4, 4:3, 3:2, 2:1, 3:1, 4:1, 5:1, and so forth.

As shown in FIG. 7, due to the relatively larger difference in the IDs 152 and 158 (e.g., when compared to the relatively small difference in the IDs 98 and 100 of FIG. 4), the inner wall 112 of the adapter 104 may include a tapered portion 150 at the pipe-end 108 that is more pronounced compared to the taper 156 at the hose-end 110. For instance, the amount by which the taper 150 decrease the ID 152 at the opening 148 to provide the transition to the intermediate ID 154 is greater compared to the amount by which the taper 156 decreases the ID 158 at the opening 149 in transitioning to the intermediate ID 154. Thus, like the embodiment shown in FIGS. 2-4, the tapered portions 150 and 156 along the inner wall 112 provide for a gradual sloping transition from the ID 152 at the pipe-end 108, to the intermediate ID 154, and to the ID 158 at the hose-end 110 of the adapter 104, wherein the transition on the end having the greater ID (e.g., pipe-end 108) is generally of a greater slope. As mentioned above, the taper could be one or more conical surfaces or curved surfaces. For example, the diameter along the inside wall 112 of the adapter 104 may change linearly or curvilinearly from the ID 152 to the ID 154, and from the ID 154 to the ID 158. Additionally, in some embodiments, a curvilinear slope may be a concave or convex, or a combination of concave or convex sloping transitions. In this manner, the tapered inner wall 112 provides a generally smooth and aerodynamic flow path that reduces the presence of obstacles which may disrupt fluid flow which, as mentioned above, may be the case with certain conventional adapter configurations.

Again, it should be understood that the specific dimensions provided herein with respect to FIGS. 5-7 are by way of example only. Indeed, in other embodiments, the adapter 104 may be configured to provide an interface between pipes and hoses having other dimensions, such as between a hose having an ID of 2 inches and a 3 inch nominal diameter ANSI Schedule 40 PVC pipe having an ID of approximately 3.06 inches, between a hose having an ID of 2 inches and a 4 inch nominal diameter ANSI Schedule 40 PVC pipe having an ID of approximately 4.03 inches, between a hose having an ID of 2 inches and a 5 inch diameter ANSI Schedule 40 PVC pipe having an ID of approximately 5.05 inches, or any suitable configuration in which the IDs of the fluid conduits results in the IDs at the opposite ends 108 and 110 of the adapter 104 having a difference of greater than approximately 0.1 inches.

Continuing to FIGS. 8-10, a third embodiment of an adapter, referred to by reference number 170 is illustrated in accordance with aspects of the present disclosure. Specifically, FIG. 8 shows a perspective view of the adapter 170, FIG. 9 shows a side view of the adapter 170, and FIG. 10 shows a cross-sectional view of the adapter 170 coupled to a nozzle 184 and taken along the cut-line 10-10 of FIG. 9. To facilitate a clearer description of the disclosed subject matter, FIGS. 8-10 will generally be described together.

The adapter 170, as shown in FIGS. 8-10, includes a protrusion 172 that is intermediate a first end 174 and a second end 176. The protrusion 172 may include one or more mounting holes 182 by which a user may fasten the adapter 170 to a desired location within a fluid-based system, such as the system 10 (FIG. 1). For instance, the adapter 170 may be fastened to another component of the system 10, or to a mounting structure. The adapter 170 also includes an inner wall 178 which may be tapered at the first end 174 and second end 176 to provide a gradual transition between the IDs at each the openings 175 and 177 (FIG. 10) corresponding to the first end 174 and second end 176, respectively, of the adapter 170.

As shown in FIGS. 8-10, the first end 174 may be configured to fit to a hose (not shown) located upstream (e.g., the direction 56) with respect to the direction (e.g., downstream direction 58) of air flow. Accordingly, the first end 174 in the present embodiment may be referred to as a "hose-end." Such a hose may have an outer wall and inner wall, and the hose-end 174 may include surface features or teeth 180 similar to the hose-ends 54 (FIGS. 2-4) and 110 (FIGS. 5-7), such as spiral grooves or protrusions, or a parallel series of ring-shaped grooves or ridges, etc., which facilitate coupling of a hose to the hose-end 174. For example, the surface features 180 may be configured to grip the inner wall of a hose, thus securing the hose onto the hose-end 174. When coupled onto the hose-end 174, the hose may abut the protrusion 172.

The second end 176 of the adapter 170 may be threaded (as shown by threads 192) and may be configured to couple to a nozzle 184 having a coupling end 186 and an outlet 188. The opening at the coupling end 186 of the nozzle 184 may have an ID 197 and be configured to mount onto the second end 176 (e.g., the "nozzle-end") by being threaded (e.g., screwed) onto the threads 192. In certain embodiments, the nozzle-end 176 with the threads 192 may be formed to a particular dimension in accordance with the National Pipe Thread (NPT) standard. As shown in FIG. 9, the hose-end 174 has an OD 194, and the nozzle-end 176 has an OD 196. By way of example only, the OD 194 of the hose-end 174 may be configured to fit a hose having an ID of 2 inches, and the nozzle end 176 may be sized based upon a ¾" nominal NPT dimensions, such that the OD 196 is approximately 1.05 inches.

In the illustrated embodiment, the nozzle 184 may be model of a Loc-Line® nozzle, available from Lockwood Products, Inc. of Lake Oswega, Oreg. When assembled, the hose (not shown), the adapter 170, and the nozzle 184 may define a fluid flow path that shares a common longitudinal axis, referred to here by reference number 190. As will be appreciated, the adapter 170 may be used in the system 10 (FIG. 1) in conjunction with one or more of the adapters 22B or 104 for coupling various types of fluid conduits. For example, a hose used within the system 10 may have a first end coupled to a hose-end of one of the adapters 22B or 104, and a second end coupled to the adapter 170, such that an air flow through the hose exits via the nozzle 184.

Referring now to FIG. 10, which shows a cross-sectional view of the adapter 170 and a portion of the nozzle 184 taken through the longitudinal axis 190 and along the cut-line 10-10 of FIG. 9, the opening 175 at the hose-end 174 may have an ID 202, and the opening at the nozzle end 177 may have an ID 204. The inner wall 178 of the adapter 170 may include a tapered portion 200 at the hose-end 174, which provides for a gradual transition from the ID 202 to the ID 204 of the nozzle-end 176. Again, it should be understood that the taper could be one or more conical surfaces or curved surfaces. For example, the diameter along the inside wall 178 of the adapter 170 may change linearly or curvilinearly from the ID 202 to the ID 204. Additionally, in some embodiments, a curvilinear slope may be a concave or convex, or a combination of concave or convex sloping transitions. In this manner, the tapered inner wall 178 provides a generally smooth and aerodynamic flow path that reduces the presence of obstacles which may disrupt fluid flow, as may be the case with certain conventional adapter configurations.

Again, it should be understood that the specific examples of hose, adapter, and nozzle dimensions discussed herein with respect to FIGS. 8-10 are provided by way of example only. Indeed, in other embodiments, the adapter 170 may be configured to provide an interface between hoses and nozzles having other dimensions. By way of example, OD 194 of the hose-end 174 may be configured to fit to a hose having an ID of between approximately 1 to 6 inches or more (e.g., such as 1, 1.5, 2, 2.5, 3, 3.5, 4, 4.5, 5, 5.5, or 6 inches). The OD 196 of the nozzle end 176 may be configured to fit to the coupling portion 186 of a nozzle 184 having an ID 197 that is between 0.25 to 3 inches (e.g., such as 0.25, 0.5, 1, 1.5, 2, 2.5, or 3 inches), with the understanding that the OD 196 is generally less than the OD 202 of the hose-end 174. As discussed above, in certain embodiments, the OD 196 may be defined based upon NPT nominal dimensions.

Further, while the above-discussed embodiments relate to adapters that provide an interface for joining a hose and a pipe (e.g., the adapters 22B and 104 of FIGS. 2-7) and to adapters that provide an interface for joining a nozzle and a hose, other embodiments of adapters in accordance with the present disclosure may provided interfaces for joining a pipe to another pipe, for joining a pipe to a nozzle, or for joining a hose to another hose. For instance, in an adapter embodiment that joins two pipes, the first and second ends of the adapter may be generally smooth (e.g., without surface features such as 72 or 110) and may be configured to fit against the inside wall of respective pipes, secured by an adhesive, such as glue. Additionally, in an adapter embodiment that joins two hoses, both ends of the adapter may include surface features to provide a grip for securing the adapter ends to the inner walls of respective hoses.

While only certain features of the invention have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system comprising:
   a homogeneous integrally formed one-piece annular shaped tubular adapter configured to provide an interface between a plastic fluid conduit and a metal fluid conduit, wherein the adapter comprises:
   a longitudinal central axis along the length of the adapter;
   a first end comprising a first terminal end, a first opening at the first terminal end, and a first smooth right circular cylindrical outer surface along the entire length of the first end, the first smooth right circular cylindrical outer surface being devoid of radial protrusions and recesses, wherein the first smooth right circular cylindrical outer surface is configured to fit inside a first inside wall of the plastic fluid conduit;
   a second end comprising a second terminal end, a second opening at the second terminal end, and a second smooth right circular cylindrical outer surface substantially along the entire length of the second end, the second smooth right circular cylindrical outer surface being devoid of radial protrusions and comprising a single spiral groove formed in the second smooth right circular cylindrical outer surface, wherein the spiral groove is configured to enable coupling to a second inside wall of the metal fluid conduit;
   an annular protrusion separating the first smooth right circular cylindrical outer surface of the first end from the second smooth right circular cylindrical outer surface of the second end, wherein the first smooth right circular cylindrical outer surface of the first end abuts the annular protrusion and the annular protrusion abuts the second smooth right circular cylindrical outer surface of the second end, wherein the first smooth right circular cylindrical outer surface has a first radial diameter, the second smooth right circular cylindrical outer surface has a second radial diameter, and the annular protrusion has a third radial diameter; wherein the third radial diameter is greater than the first radial diameter and the first radial diameter is different than the second radial diameter, and wherein the annular protrusion is configured to abut the plastic fluid conduit when the plastic fluid conduit is fitted on the first end of the adapter; and
   an inner wall that extends from the first opening to the second opening, wherein the inner wall of the adapter has a first curvilinear transition in an axial direction of the adapter from a first inside diameter at the first opening of the first end to an intermediate diameter between the first and second ends, and the inner wall of the adapter has a second curvilinear transition in the axial direction from a second inside diameter at the second opening of the second end to the intermediate diameter;
   wherein the first curvilinear transition decreases in diameter from the first inside diameter to the intermediate diameter, and the second curvilinear transition decreases in diameter from the second inside diameter to the intermediate diameter, wherein the first curvilinear transition begins at the first opening, the second curvilinear transition begins at the second opening, and the first and second curvilinear transitions each comprise a convex sloping transition; and
   wherein the first terminal end comprises a first annular surface transverse to the central axis of the adapter that extends radially from the first opening to the outer surface of the first end, the first annular surface having a first radial thickness, wherein the second terminal end comprises a second annular surface transverse to the central axis of the adapter that extends radially from the second opening to the outer surface of the second end, the second annular surface having a second radial thickness, and wherein the first radial thickness is different than the second radial thickness.

2. The system of claim 1, wherein the inner wall of the adapter is curvilinear substantially in the axial direction along an entire length of the adapter between the first and second openings.

3. The system of claim 1, wherein the first smooth right circular cylindrical outer surface is configured to fit inside the plastic fluid conduit and be affixed to the plastic fluid conduit using an adhesive.

4. The system of claim 1, wherein the adapter is made from a material comprising polyvinyl chloride or stainless steel.

5. The system of claim 1, comprising an air blower coupled to the metal fluid conduit and an air knife coupled to the plastic fluid conduit.

6. The system of claim 5, wherein the metal fluid conduit comprises stainless steel and the plastic fluid conduit comprises polyvinyl chloride.

7. A system comprising:
an annular shaped tubular adapter constructed as a homogeneous integrally formed one-piece structure, the adapter comprising:
- a longitudinal central axis along the length of the adapter;
- a first end comprising a first terminal end and a first smooth right circular cylindrical outer surface along the entire length of the first end, the first smooth right circular cylindrical outer surface being devoid of radial protrusions and recesses, wherein the first smooth right circular cylindrical outer surface is configured to fit against a first inside wall of a plastic fluid conduit and be affixed to the first inside wall using an adhesive; and
- a second end comprising a second terminal end and a second smooth right circular cylindrical outer surface along the entire length of the second end, the second smooth right circular cylindrical outer surface being devoid of radial protrusions and comprising a single spiral groove formed in the second smooth right circular cylindrical outer surface, wherein the spiral groove is configured to enable coupling to a second inside wall of a metal fluid conduit;
- an annular protrusion separating the first smooth right circular cylindrical outer surface of the first end from the second smooth right circular cylindrical outer surface of the second end, wherein the first smooth right circular cylindrical outer surface has a first radial diameter, the second smooth right circular cylindrical outer surface has a second radial diameter, and the annular protrusion has a third radial diameter; wherein the third radial diameter is greater than the first radial diameter and the first radial diameter is different than the second radial diameter, and wherein the annular protrusion is configured to abut the plastic fluid conduit when the plastic fluid conduit is fitted on the first end of the adapter;
- wherein the first end comprises a first opening at the first terminal end having a first inner diameter, the second end comprises a second opening at the second terminal end having a second inner diameter, wherein an inner wall of the adapter has a first sloping transition that gradually decreases in diameter from the first inner diameter at the first opening to an intermediate diameter between the first and second terminal ends in an axial direction of the adapter, the inner wall has a second sloping transition that gradually decreases in diameter from the second inner diameter at the second opening to the intermediate diameter in the axial direction of the adapter, the inner wall is sloping substantially along an entire length from the first inner diameter at the first terminal end to the second terminal inner diameter at the second end along the axial direction, and the first inner diameter and the second inner are substantially the same;
- wherein the first sloping transition comprises a first curvilinear transition and the second sloping transition comprises a second curvilinear transition, the first curvilinear transition beginning at the first opening, and the second curvilinear transition beginning at the second opening, and the first and second curvilinear transitions each comprising a convex sloping transition; and
- wherein the first terminal end comprises a first annular surface transverse to the central axis of the adapter that extends radially from the first opening to the outer surface of the first end, the first annular surface having a first radial thickness, wherein the second terminal end comprises a second annular surface transverse to the central axis of the adapter that extends radially from the second opening to the outer surface of the second end, the second annular surface having a second radial thickness, and wherein the first radial thickness is different than the second radial thickness.

8. The system of claim 7, wherein the inner wall is curvilinear substantially along the entire length from the first inner diameter at the first terminal end to the second inner diameter at the second terminal end.

9. The system of claim 7, comprising an air blower coupled to the metal fluid conduit and an air knife coupled to the plastic fluid conduit.

10. The system of claim 9, wherein the adapter and the plastic fluid conduit comprise a common material of construction.

11. The system of claim 10, wherein the adapter and the plastic fluid conduit comprise polyvinyl chloride.

12. The system of claim 7, comprising the plastic fluid conduit and the metal fluid conduit, wherein the plastic fluid conduit and the metal fluid conduit comprise the same nominal diameter.

13. The system of claim 12, wherein the plastic fluid conduit comprises polyvinyl chloride, the adapter comprises polyvinyl chloride, and the metal fluid conduit comprises stainless steel.

14. A system comprising:
an air knife;
an air supply assembly coupled to the air knife, wherein the air supply assembly comprises:
- an air blower;
- a plastic fluid conduit having a first inside wall, the first inside wall having a plastic fluid conduit inner diameter and coupled to the air knife;
- a metal fluid conduit having a second inside wall, the second inside wall having a metal fluid conduit inner diameter and coupled to the air blower, wherein the plastic fluid inner diameter is different than the metal fluid conduit inner diameter; and
- an adapter constructed as a homogeneous integrally formed one-piece annular shaped tubular structure and coupled to the plastic fluid conduit and the metal fluid conduit wherein the adapter comprises:
  - a longitudinal central axis along the length of the adapter;
  - a first end comprising a first terminal end, a first smooth right circular cylindrical outer surface along the entire length of the first end, and a first opening at the first terminal end with a first inner diameter, wherein the first smooth right circular cylindrical outer surface is devoid of radial protrusions and recesses, wherein the first smooth right circular cylindrical outer surface is coupled to the first inside wall of the plastic fluid conduit;
  - a second end comprising a second terminal end, a second smooth right circular cylindrical outer surface along the entire length of the second end, and a second opening at the second terminal end with a second inner diameter, wherein the second smooth right circular cylindrical outer surface is devoid of radial protrusions and comprises a single spiral groove formed in the second smooth right circular cylindrical outer surface, wherein the second end is coupled to the second inside wall of the metal fluid conduit;

an annular protrusion separating the first smooth right circular cylindrical outer surface of the first end from the second smooth right circular cylindrical outer surface of the second end, wherein the first smooth right circular cylindrical outer surface of the first end abuts the annular protrusion and the annular protrusion abuts the second smooth right circular cylindrical outer surface of the second end, wherein the first smooth right circular cylindrical outer surface has a first radial diameter, the second smooth right circular cylindrical outer surface has a second radial diameter, and the annular protrusion has a third radial diameter; wherein the third radial diameter is greater than the first radial diameter and the first radial diameter is different than the second radial diameter, and wherein the annular protrusion is configured to abut the plastic fluid conduit when the plastic fluid conduit is fitted on the first end of the adapter; and an inner wall that extends from the first opening to the second opening, wherein the inner wall is curvilinear substantially along the length of the adapter from the first inner diameter at the first opening to the second inner diameter at the second opening in an axial direction of the adapter, the inner wall has a first curvilinear transition in an axial direction from a first inside diameter at the first opening of the first end to an intermediate diameter between the first and second ends, and the inner wall has a second curvilinear transition in the axial direction from a second inside diameter at the second opening of the second end to the intermediate diameter; wherein the first curvilinear transition decreases in diameter from the first inside diameter to the intermediate diameter, and the second curvilinear transition decreases in diameter from the second inside diameter to the intermediate diameter, wherein the first curvilinear transition begins at the first opening and the second curvilinear transition begins at the second opening; and wherein the first and second curvilinear transitions each comprise a convex sloping transition; and wherein the first terminal end comprises a first annular surface transverse to the central axis of the adapter that extends radially from the first opening to the outer surface of the first end, the first annular surface having a first radial thickness, wherein the second terminal end comprises a second annular surface transverse to the central axis of the adapter that extends radially from the second opening to the outer surface of the second end, the second annular surface having a second radial thickness, and wherein the first radial thickness is different than the second radial thickness.

15. The system of claim 14, wherein the adapter and the plastic fluid conduit comprise polyvinyl chloride and the metal fluid conduit comprises stainless steel.

\* \* \* \* \*